United States Patent [19]

Fujita et al.

[11] Patent Number: 5,222,415
[45] Date of Patent: Jun. 29, 1993

[54] STEERING WHEEL HAVING AN IMPACT ENERGY ABSORBING MEMBER

[75] Inventors: Yoshiyuki Fujita; Akio Hosoi, both of Inazawa, Japan

[73] Assignee: Toyoda Goset Co., Ltd., Nishikasugai, Japan

[21] Appl. No.: 874,834

[22] Filed: Apr. 28, 1992

[30] Foreign Application Priority Data

Apr. 30, 1991 [JP] Japan ................... 3-098424

[51] Int. Cl.$^5$ ............ B62D 1/04; B60R 21/05
[52] U.S. Cl. ........................... 74/552; 280/777
[58] Field of Search ............. 74/552; 280/777

[56] References Cited

U.S. PATENT DOCUMENTS

| | | | |
|---|---|---|---|
| 3,368,422 | 2/1968 | Walter | 74/552 X |
| 4,790,209 | 12/1988 | Ishida | 74/552 |
| 4,939,951 | 7/1990 | Kaneko | 74/552 |
| 4,962,947 | 10/1990 | Nagata et al. | 74/552 X |
| 5,067,367 | 11/1991 | Hashiba et al. | 74/552 |

FOREIGN PATENT DOCUMENTS 168635 5/1989 Japan .
1158374 11/1989 Japan .

Primary Examiner—Rodney H. Bonck
Attorney, Agent, or Firm—Cushman, Darby & Cushman

[57] ABSTRACT

A steering wheel having an impact energy absorbing member capable of absorbing a predetermined amount of impact energy while being attached in a predetermined position to the steering wheel through its upper portion. The steering wheel includes a boss assembly provided at the center of the steering wheel and including a metallic core. The impact energy absorbing member which is disposed above the metallic core and which is capable of deforming by being reduced in size generally in the axial direction of a steering shaft when it receives an impact force applied in the axial direction, and a pad disposed over the impact energy absorbing member to cover the same. The impact energy absorbing member has attachment extensions projecting outward from its upper peripheral portion generally parallel to its central portion. An attachment hole is formed in each attachment extension to enable the impact energy absorbing member to be fixed to the steering wheel with a screw. The attachment hole is opened in the peripheral portion thereof on the pad outer edge side when impact force is applied to the pad.

3 Claims, 10 Drawing Sheets

STEERING WHEEL HAVING AN IMPACT ENERGY ABSORBING MEMBER

BACKGROUND OF THE INVENTION

This invention relates to a steering wheel mounted on a body of a motor vehicle and having an impact energy absorbing member.

In a conventional steering wheel, an impact energy absorbing member is disposed between a pad placed in the highest position in a central boss assembly of the steering wheel and a group of other boss assembly members, i.e., a boss connected to a steering shaft and a boss core formed of a metallic plate. Known impact energy absorbing members for this kind of use include a metallic plate having a generally U-shaped cross-section open at its bottom and a tubular member formed of a brittle plastic such as hard foamed urethane (e.g., those disclosed in Japanese Utility Model Unexamined Publication Nos. 1-158374 and 1-68635).

When an impact force is applied to an impact energy absorbing member from above, it is plastically deformed if it is formed of a metallic plate, or is deformed by brittle fracture if it is formed of a brittle plastic. The member is deformed to absorb the impact energy by reducing its size generally in the axial direction of the steering shaft.

The conventional impact energy absorbing member is therefore arranged to be attached to the steering wheel body at a lower position such as to avoid obstruction to its deformation, i.e., to enable a reduction in height when an impact force is applied thereto from above.

In steering wheels using the conventional impact energy absorbing member, a pad for convering the impact energy absorbing member is disposed above the impact energy absorbing member and is attached to this member. That is, the pad is attached to the steering wheel body with the impact energy absorbing member interposed therebetween. It is therefore difficult to position the pad correctly on the steering wheel body with respect to an upper surface of a spoke covering layer provided on the steering wheel body.

To enable the pad to be positioned easily with respect to the upper surface of the spoke covering layer, the pad and the impact energy absorbing member may be assembled in such a manner that the impact energy absorbing member is attached to a portion of the steering wheel body in the vicinity of the upper surface of the spoke covering layer, and the pad is attached to a portion of the impact energy absorbing member in the vicinity of the upper surface of the spoke covering layer.

In this type of steering wheel, however, an upper surface of the pad is positioned so as to be generally flush with a formed surface of a steering wheel ring and not to protrude beyond this surface, and the upper surface of the spoke covering layer is formed so as to be generally flush with the upper surface of the pad.

For this reason, the impact energy absorbing member is attached, by utilizing a portion in the vicinity of the upper surface of the spoke covering layer, to the steering wheel body by its upper portion.

If the impact energy absorbing member is attached to the steering wheel body by its upper portion, it is difficult for the impact energy absorbing member to have its specific property, i.e., a capability to be deformed so as to be reduced in height when an impact force is applied thereto.

In view of the above-described problems, an object of the present invention is to provide a steering wheel having an impact energy absorbing member capable of absorbing a predetermined amount of impact energy while being attached in a predetermined position to the steering wheel through its upper portion.

SUMMARY OF THE INVENTION

To achieve this object, according to the present invention, there is provided a steering wheel comprising a boss assembly provided at the center of the steering wheel and constituted of a metallic core, an impact energy absorbing member disposed above the metallic core, the impact energy absorbing member being capable of deforming by being reduced in size generally in the axial direction of a steering shaft when it receives an impact force applied in the same direction, and a pad disposed over the impact energy absorbing member to cover the same. The impact energy absorbing member has attachment extensions projecting outward from its upper peripheral portion generally parallel to its major portion. An attachment hole is formed in each attachment extension to enable the impact energy absorbing member to be fixed to the steering wheel with a screw. The attachment hole is formed so as to open a peripheral portion thereof on the pad outer edge side.

In the steering wheel in accordance with the present invention, the attachment extension projecting outward from its upper peripheral portion generally parallel to its major portion is fixed to the steering wheel body by utilizing the attachment hole.

However, since the attachment hole is opened at a peripheral portion thereof on the pad outer edge side, when an impact force is applied to the impact energy absorbing member from above through the pad, and when the impact energy absorbing member starts deforming so that its upper portion is brought closer to its lower portion, the attachment extension comes off the steering wheel body in such a manner that the screw is disengaged from the open portion on the periphery of the attachment hole.

The impact energy absorbing member can therefore be deformed so that its upper portion is brought closer to its lower portion to absorb a predetermined amount of impact energy.

Consequently, in the steering wheel in accordance with the present invention, the impact energy absorbing member can absorb a predetermined amount of impact energy even if it is attached in a predetermined position to the steering wheel through its upper portion.

DESCRIPTION OF THE PREFERRED EMBODIMENTS

Preferred embodiments of the present invention will be described below in detail with reference to the accompanying drawings.

Figure 1:
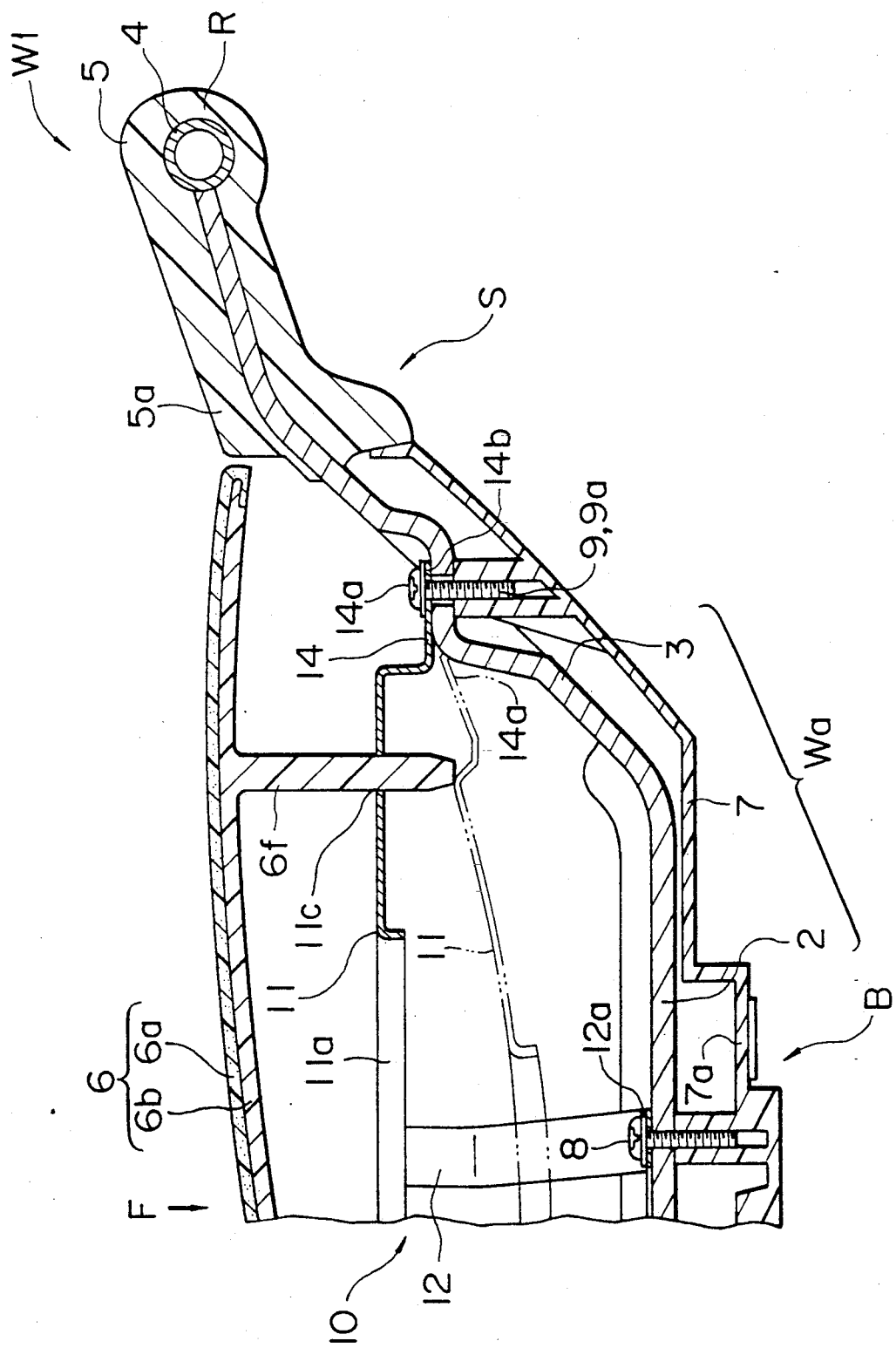
FIG. 1 is a cross-sectional view of a steering wheel in accordance with a first embodiment of the present invention taken along the line I—I of FIG. 2.
Figure 2:
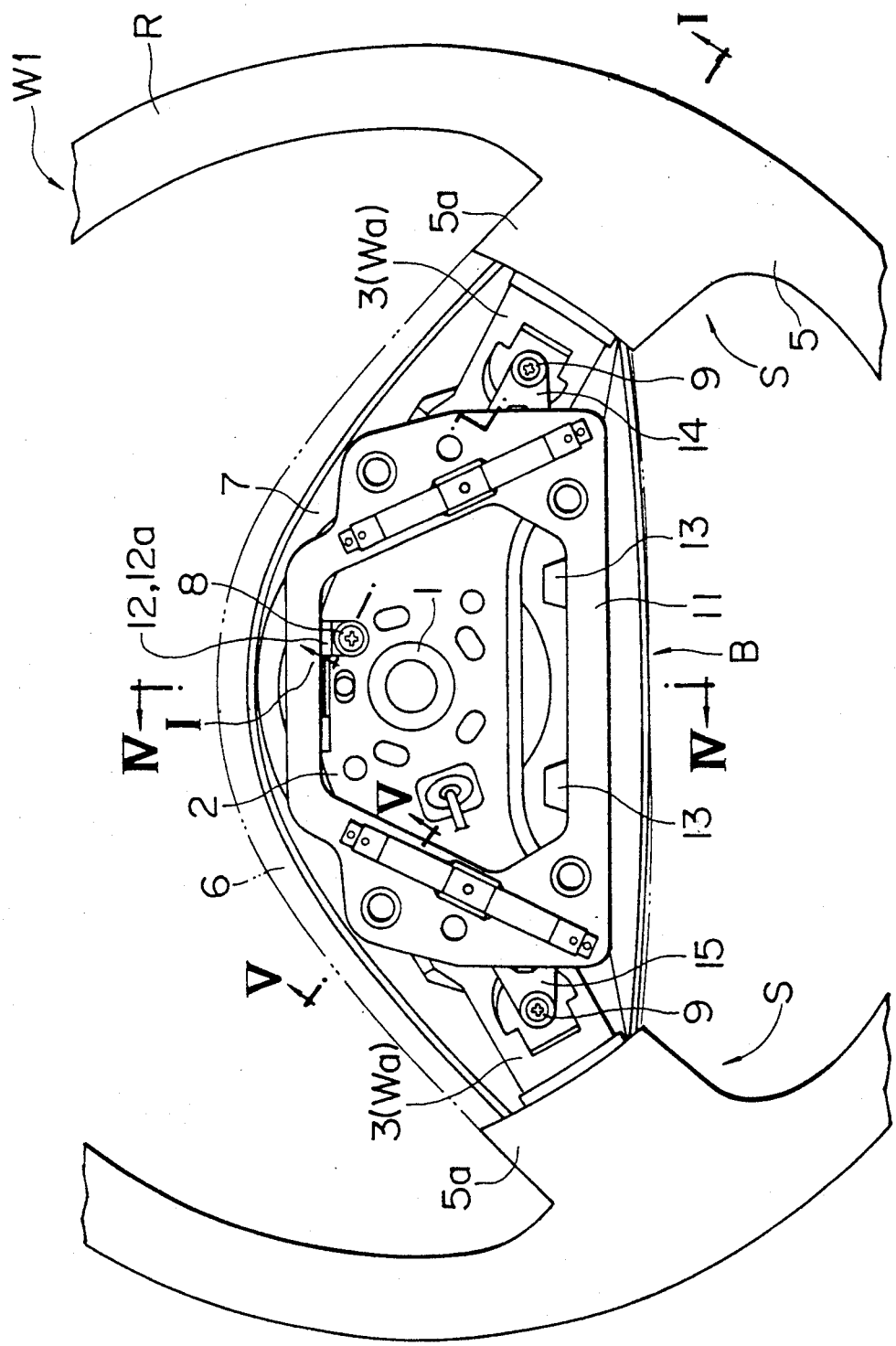
FIG. 2 is a plan view of the steering wheel in accordance with the first embodiment in a state where the pad is removed.
Figure 3:
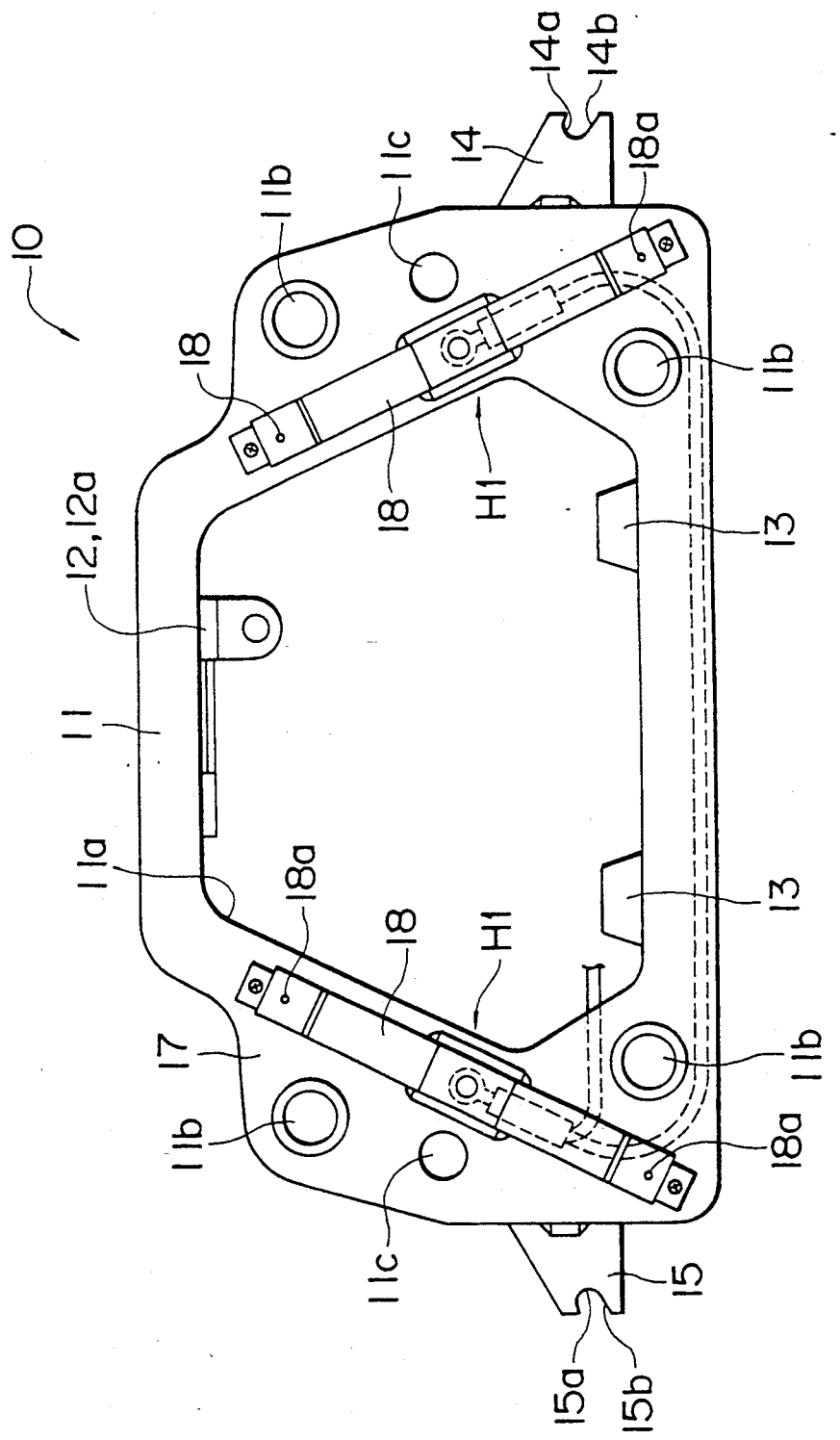
FIG. 3 is a plan view of an impact energy absorbing member in accordance with the first embodiment.
Figure 4:
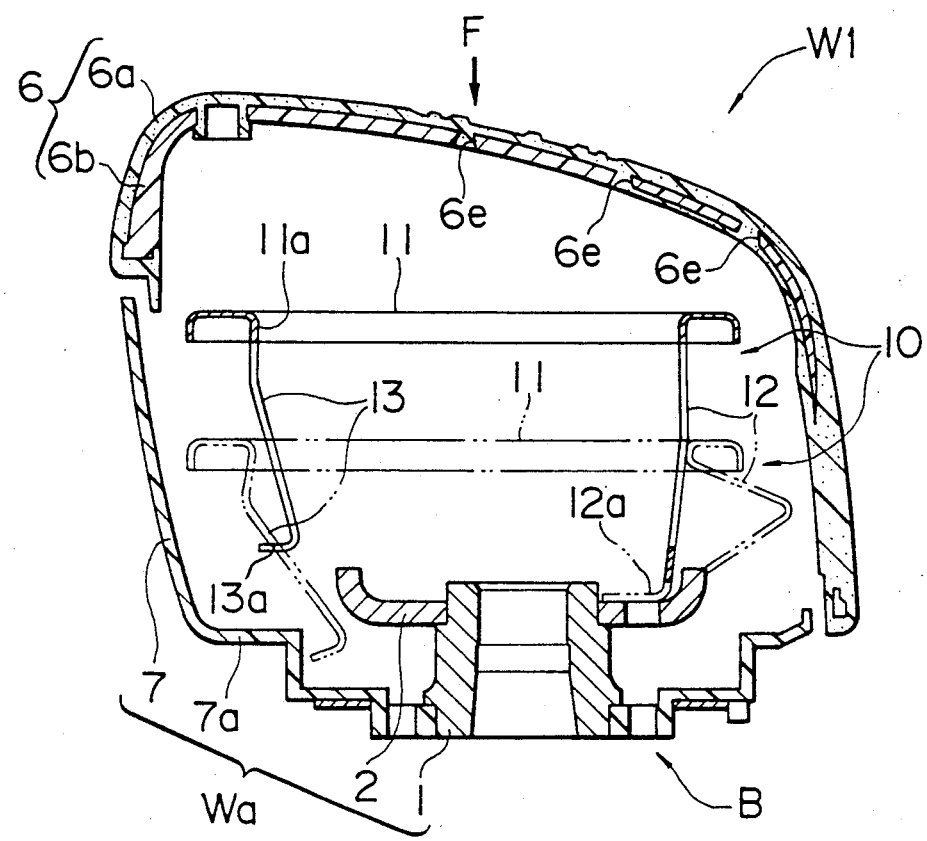
FIG. 4 is a cross-sectional view of the steering wheel in accordance with the first embodiment taken along the line IV—IV of FIG. 2.

As shown in FIGS. 1, 2, and 4, a steering wheel W1 in accordance with the first embodiment of the present invention has a circular-ring portion R, a boss assembly B disposed at the center of the ring portion R, and a pair of spoke portions S which connect the boss assembly B and the ring portion R.

A boss 1 formed of steel and a boss plate 2 also formed of steel and welded to the boss 1 are disposed as lower members of the boss assembly B. The boss 1 is connected to an unillustrated steering shaft. The boss assembly also includes an impact energy absorbing member 10 formed of a metallic plate and disposed above the boss 1 and the boss plate 2, and a pad 6 disposed above the impact energy absorbing member 10 so as to entirely cover member 10.

A metallic core 3 formed of a steel plate integrally with the boss plate 2 is provided in each spoke portion S, and a metallic core 4 formed of a steel tube welded to the metallic spoke core 3 is provided in the ring portion R.

A covering layer 5 of a synthetic resin such as polypropylene is formed around the metallic ring core 4 and portions of the metallic spoke cores 3.

A lower cover 7 formed of a hard synthetic resin is provided which is fixed together with the impact energy absorbing member 10 to the metallic spoke cores 3 and the boss plate 2 with screws 8 and 9 to cover lower portions of the boss assembly B and the spoke portions S.

As shown in FIGS. 1 to 4, the impact energy absorbing member 10 has an upper wall portion 11 having a through hole 11a formed at its center, a fore leg portion 12 extending from a central front side portion of the upper wall portion 11 and having a slit (not shown) formed at its center, and a pair of rear leg portions 13 extending downward from two rear side portions of the upper wall portion 11. Extensions 12a and 13a (FIG. 4) bent to a rear side of the steering wheel W1 are formed at lower ends of the fore and rear leg portions 12 and 13. The extension 12a is connected to the boss plate 2 by screw (FIGS. 1, 2), and the extensions 13a are disposed above a bottom surface 7a of the lower cover 7.

Fixation of the extension 12a by screw 8 is not specifically necessary since portions of laterdescribed attachment extensions 14 and 15 are fixed to metallic spoke cores 3 with screws 9. However, while the impact energy absorbing member 10 is disposed with stability so as to abut against the boss plate 2 without being fixed to the same, there is a risk of occurrence of abnormal noise during travelling of the vehicle. For this reason, the extension 12a is fixed as mentioned above. If the impact energy absorbing member 10 is disposed with desired stability by attaching the attachment extensions 14 and 15, the extension 12a may be disposed above the boss plate 2 or the lower cover bottom surface 7a at a distance from the same without being fixed by screw 8.

In accordance with the first embodiment, attachment extensions 14 and 15 are formed on the impact energy absorbing member 10. The attachment extensions 4 and 15 extend outwardly in a generally horizontal direction from small-step portions formed at left and right sides of the upper wall portion 11. Attachment holes 14a and 15a are formed in the attachment extensions 14 and 15 for fixing the impact energy absorbing member 10 to a steering wheel body assembly Wa with screws 9.

The steering wheel body assembly Wa referred to with respect to the first embodiment, corresponds to components of the steering wheel W1 excluding the impact energy absorbing member 10 and the pad 6. In the first embodiment, the attachment extensions 14 and 15 are fixed to portions of the metallic spoke cores 3 close to upper surface portions of spoke covering layers 5a with screws 9.

Peripheral portions of the attachment extensions 14 and 15 on the pad 6 outer edge side of the attachment holes 14a and 15a are cut to form cutouts 14b and 15b having a width approximately equal to the diameter of screws 9.

Two engagement holes 11b for engagement with engaging legs 6c (FIG. 5) of the pad 6 are formed in the upper wall portion 11 of the impact energy absorbing member 10 in the vicinity of each attachment extension 14 or 15, and one guide hole 11c into which a guide projection 6f (FIG. 1) of the pad 6 can be inserted is formed in the vicinity of each attachment extension 14 or 15. A horn switch mechanism H1 (FIGS. 3, 5) is disposed in the vicinity of each attachment extension 14 or 15 of the upper wall portion 11.

Each horn switch mechanism H1 includes a fixed contact plate 17 electrically connected to the negative terminal of a horn energization circuit, and a movable contact plate 18 formed of a plate spring which is disposed above the plate 17 while being insulated from the same, and which is electrically connected to the positive terminal of the horn energization circuit. In this embodiment, the upper wall portion 11 constitutes the fixed contact plate 17 by itself.

The pad 6 has an insert 6b formed of a hard synthetic resin such as polypropylene, and a covering layer 6a of a soft synthetic resin such as soft polyvinyl chloride with which the insert 6b is covered. The pad 6 also has on the underside of the insert 6b engaging legs 6c inserted into and engaged with the engagement holes 11b of the upper wall portion 11, pressing extensions 6d (FIG. 5) for pressing the movable contact plates 18 in the vicinity of contacts 18a, and guide projections 6f inserted into the guide holes 11c. A plurality of elongated recesses 6e (FIG. 4) are formed in the insert 6b so as to be easily bent downward when an impact force F is applied thereto.

Figure 5:
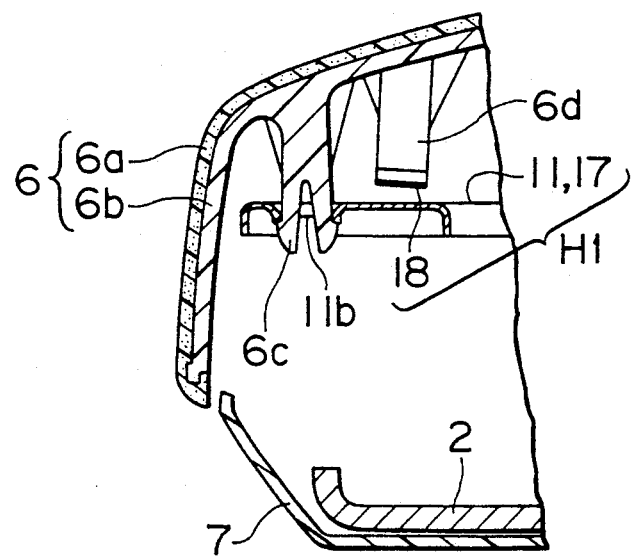
FIG. 5 is a cross-sectional view of the steering wheel in accordance with the first embodiment taken along the line V—V of FIG. 2.

The pad 6 is attached to the steering wheel body assembly in such a manner that after the impact energy absorbing member 10 and the lower cover 7 have been attached to the boss plate 2 and the metallic spoke cores 3 with screws 8 and 9, the guide projections 6f are inserted into the guide holes 11c of the impact energy absorbing member 10 while the engaging legs 6c are inserted into and engaged with the engagement holes 11b, as shown in FIGS. 1 and 5.

In the steering wheel W1 thus constructed, when impact force F is applied from the outside to an upper surface of the pad 6, the pad 6 yields and the upper wall portion 11 of the impact energy absorbing member 10 starts moving downward.

At this time, since the attachment extensions 14 and 15 of the impact energy absorbing member 10 fixed to the steering wheel body assembly Wa with screws 9 have cutouts 14b and 15b opened through a distance approximately equal to the outside diameter of a shaft portion 9a of each screw 9 on the pad 6 outer edge side of the attachment holes 14a and 15a, the attachment extensions 14 and 15 are detached from the steering wheel body assembly Wa so that the screws 9 are moved apart from the cutouts 14b and 15b of the attachment holes 14a and 15a, as indicated by double-dot-dash lines in FIG. 1.

With this detachment, the fore leg portion 12 deforms by buckling since it is in contact with the boss plate 2, and the rear leg portions 13 are brought into abutment against the bottom surface 7a of the lower cover 7 to be deformed, so that the upper wall portion 11 of the impact energy absorbing member 10 is brought closer to the lower extensions 12a and 13a, as indicated by double-dot-dash lines in FIG. 4.

Consequently, in this steering wheel W1, the attachment extensions 14 and 15 projecting from upper peripheral side portions of the impact energy absorbing member 10 generally in a horizontal direction serve to absorb a predetermined amount of energy of impact force F, even though they are fixed to the steering wheel body assembly Wa with screws 9, thereby achieving the same effect as that described in the above related art statement.

Also, in this steering wheel W1, the impact energy absorbing member 10 is mounted by utilizing its attachment extensions 14 and 15, i.e., by fixing these extensions with screws 9 to the spoke portions close to upper surface portions of the spoke covering layers 5a, and the pad 6 is mounted by utilizing the engaging holes 11b in the vicinity of the attachment extensions 14 and 15 of the upper wall portion 11 of the impact energy absorbing member 10.

That is, in the structure of the steering wheel W1, the pad 6 is disposed on the spoke portions close to upper surface portions of the spoke covering layers 5a in the steering wheel W1, so that the fit between the outer peripheral edge of the pad 6 and the spoke covering layers 5a can be improved, thereby improving the appearance of the steering wheel W1.

SECOND EMBODIMENT

Figure 6:
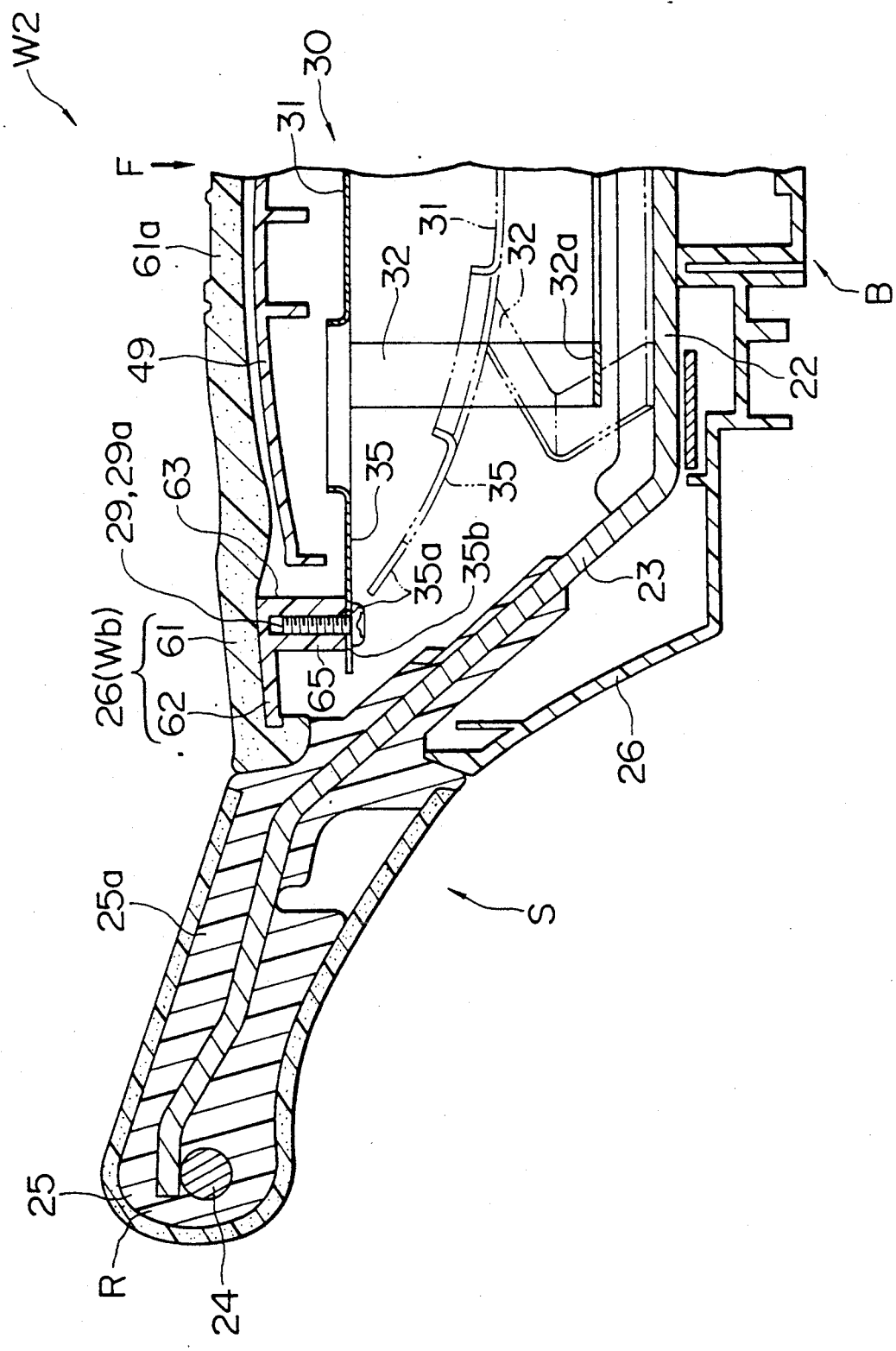
FIG. 6 is a cross-sectional view of a steering wheel in accordance with a second embodiment of the present invention taken along the line VI—VI of FIG. 12.
Figure 8:
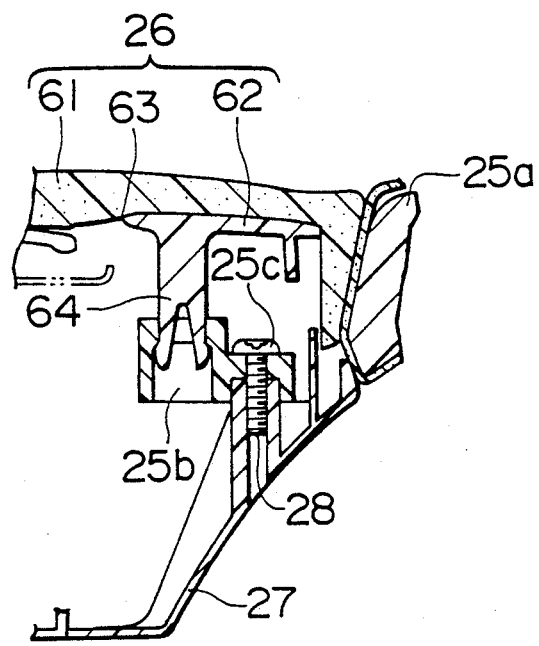
FIG. 8 is a cross-sectional view of the steering wheel in accordance with the second embodiment taken along the line VIII—VIII of FIG. 12.

Next, a steering wheel W2 in accordance with the second embodiment will be described below. In this steering wheel W2, as shown in FIGS. 6 and 8, an impact energy absorbing member 30 is supported on a pad 26 which is attached to portions of the steering wheel in the vicinity of an upper surface of a spoke covering layer 25a. A steering wheel body assembly Wb of the second embodiment therefore corresponds to components of the steering wheel W2 excluding the impact energy absorbing member 30 while including the pad 26.

Figure 7:
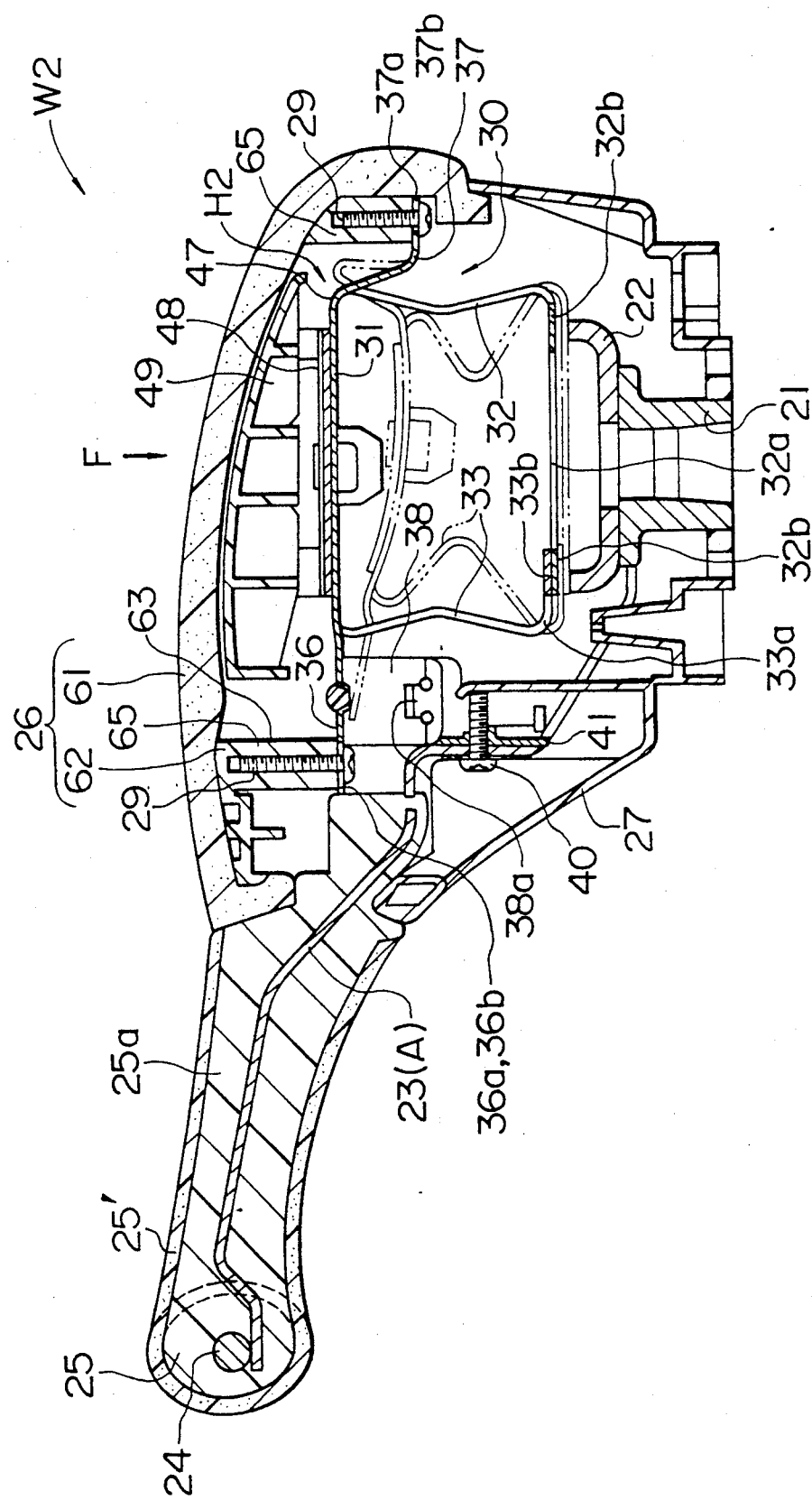
FIG. 7, is a cross-sectional view of the steering wheel in accordance with the second embodiment taken along the line VII—VII of FIG. 12.
Figure 12:
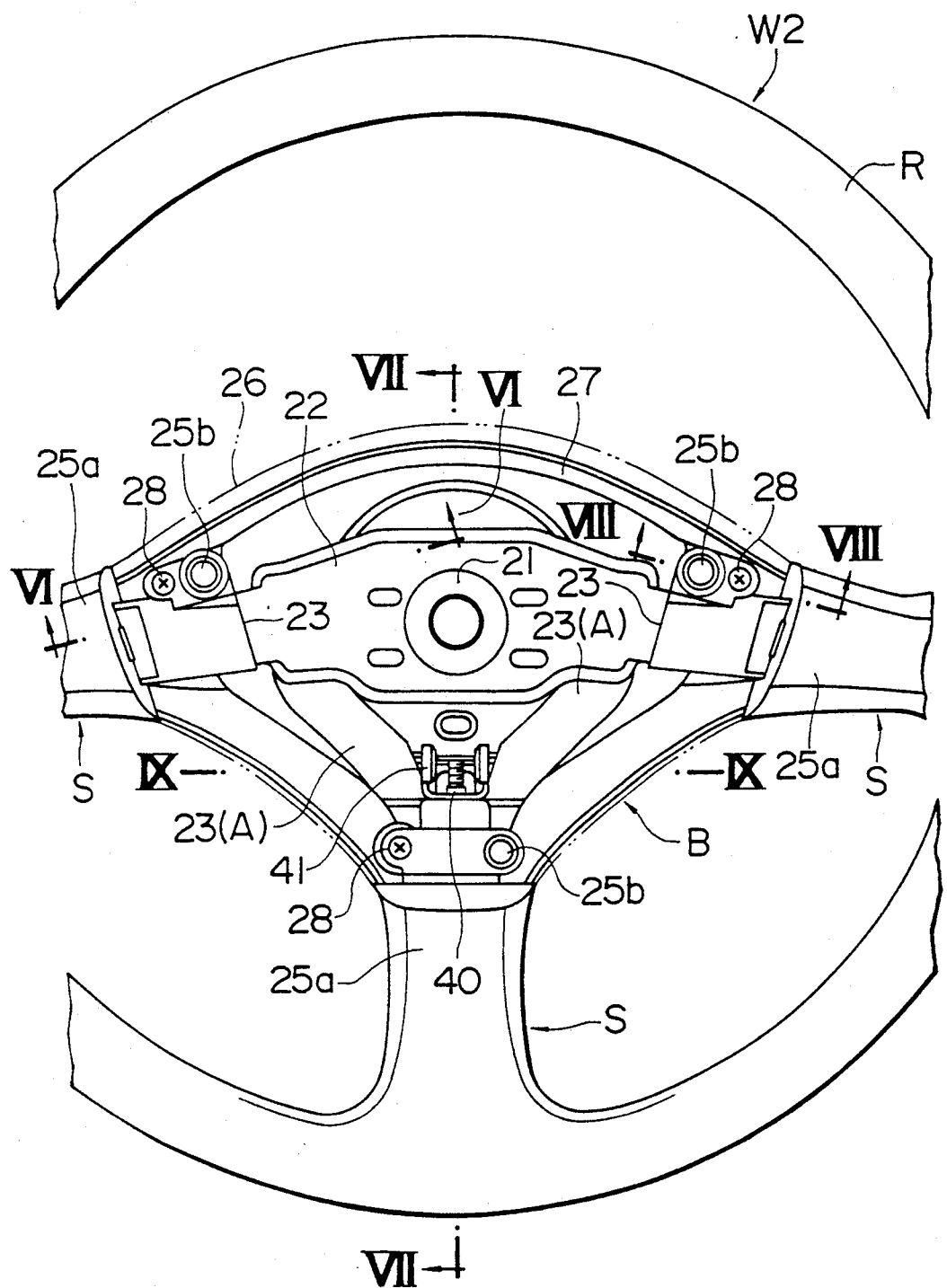
FIG. 12 is a plan view of the steering wheel in accordance with the second embodiment in a state where the impact energy absorbing member and the pad are removed.

As shown in FIGS. 6, 7, and 12, the steering wheel W2 has a circular-ring portion R, a boss assembly B disposed at the center of the ring portion R, and three spoke portions S which connect the boss assembly B and the ring portion R.

A boss 21 formed of steel and a boss plate 22 also formed of steel integrally with metallic spoke cores 23 are disposed as lower members of the boss assembly B, as in the case of the first embodiment. The impact energy absorbing member 30 formed of a metallic plate is disposed above the boss 21 and the boss plate 22, and the pad 26 is disposed above the impact energy absorbing member 30 so as to entirely cover member 30.

A covering layer 25 of a hard synthetic resin such as polypropylene is formed around a metallic ring core 24 of the ring portion R formed of a steel tube and around portions of the metallic spoke cores 23. Engagement hole 25b are formed in covering layers 25a of the spoke portions S respectively for engagement with engaging legs 64 of the pad 26 and attachment holes 25c for fixing a lower cover 27 with screws 28.

As shown in FIGS. 7 and 12, the metallic spoke core 23A on the rear side of the steering wheel W2 is forked into two portions on the boss 21 side, and the forked portions are connected to the boss 21.

A leather sheet 25' is attached to the covering layer 25.

As shown in FIGS. 6 and 7, the pad 26 in accordance with the second embodiment includes an insert 62 formed of a hard synthetic resin such as polypropylene, and a covering layer 61 of a soft synthetic resin such as soft polyvinyl chloride. The pad 26 in accordance with the second embodiment is formed in such a manner that the covering layer 61 and the insert 62 are previously formed and the insert 62 is thereafter covered with the covering layer 61. The process of forming the pad 26 may alternatively be such that the insert 62 is set in a predetermined mold and the covering layer 61 is formed by insertion molding.

Figure 10:
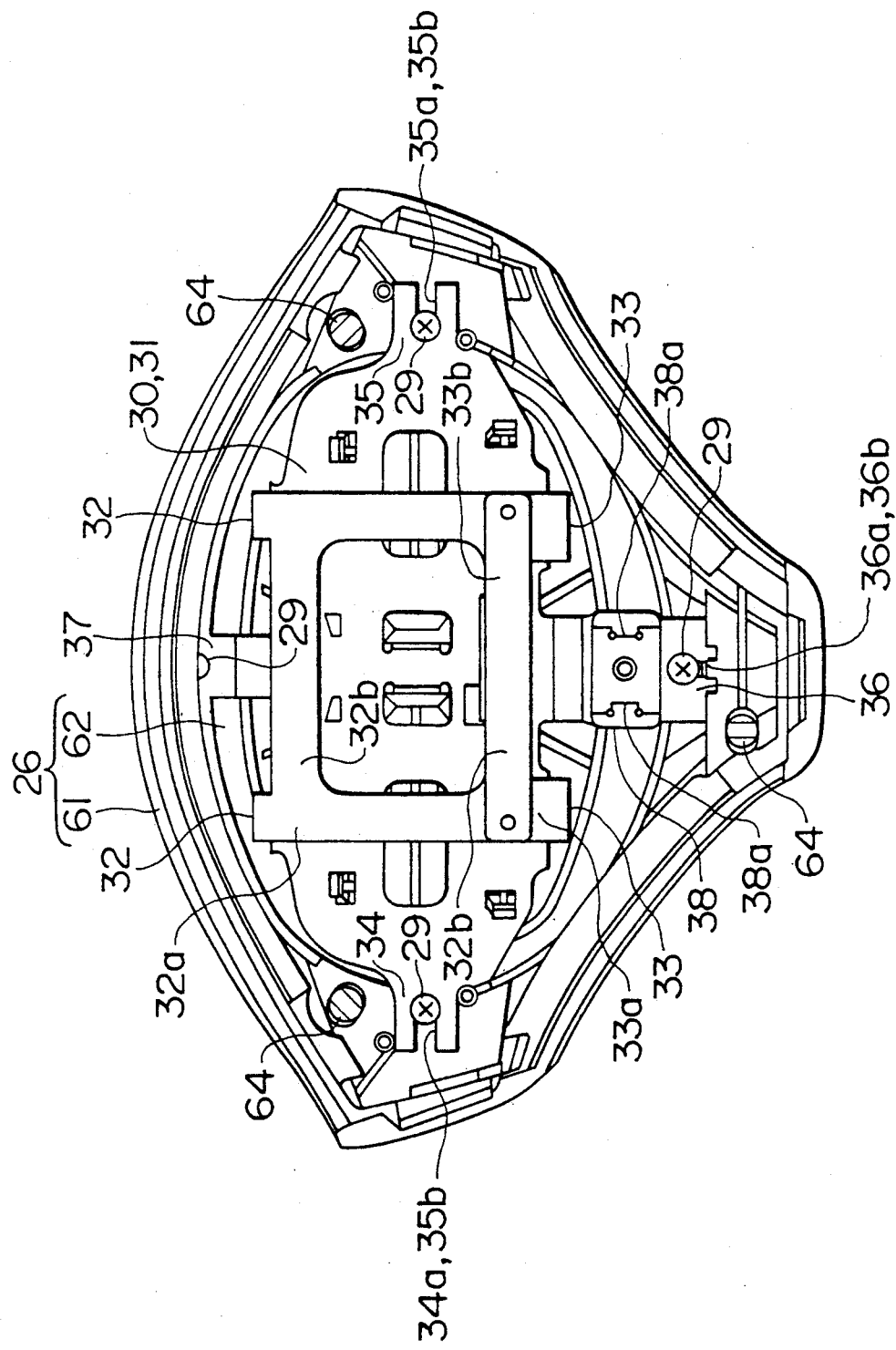
FIG. 10 is a bottom view of the pad to which an impact energy absorbing member in accordance with the second embodiment is attached.
Figure 11:
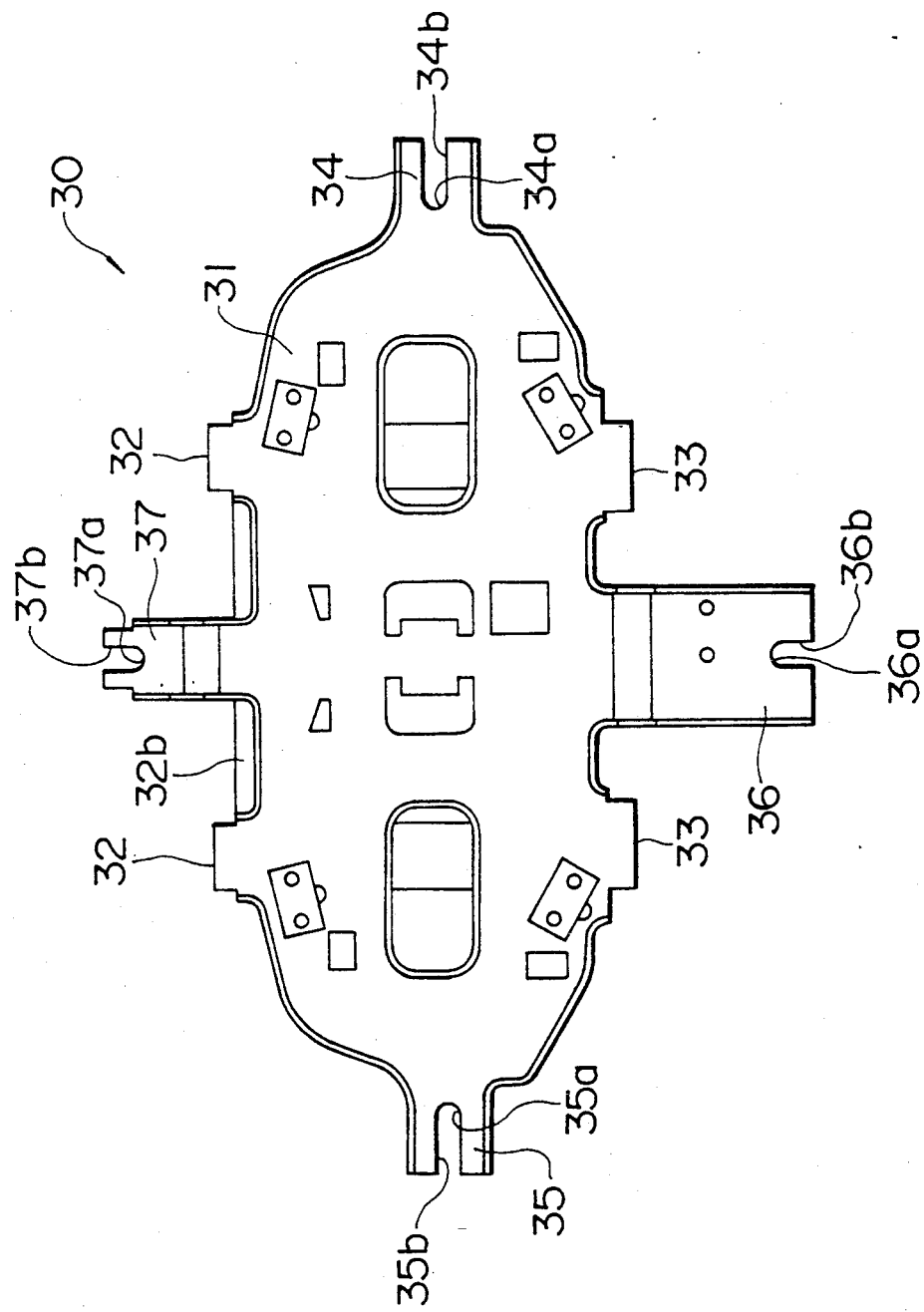
FIG. 11 is a plan view of the impact energy absorbing member in accordance with the second embodiment.

A through hole 63 is formed in the insert 62 at the center, and engaging legs 64 capable of engaging with the engagement holes 25b formed in the spoke covering layers 25a are formed in three places on peripheral portions of the insert 62, as shown in FIGS. 8 and 10. Also, cylindrical attachment portions 65 for fixing the impact energy absorbing member 30 with screws 29 are formed in four places on peripheral portions of the insert 62, as shown in FIGS. 6, 7, and 10. The area of the through hole 63 is covered with the covering layer 61 to form a pressing portion 61a for horn operation.

As shown in FIGS. 6, 7, 10, and 11, the impact energy absorbing member 30 is formed of a metallic plate and has an upper wall portion 31 in the form of a generally rectangular plate, a pair of fore legs 32 and a pair of rear legs 33. Each of the pairs of legs 32 and 33 extend downward from two fore or rear side portions of the upper wall portion 31.

The fore and rear legs have extensions 32a and 33a which are formed by being inwardly bent at lower ends of the legs. The extensions 32a extend longer than the extensions 33a and are welded to the same. The extensions 32a are connected to each other by a lateral plate 32b, and the extensions 33a are also connected to each other by a lateral plate 33b.

In accordance with the second embodiment, attachment extensions 34, 35 and 36 are formed on the impact energy absorbing member 30. The attachment extensions 34, 35, and 36 extend outward and parallel to a major surface of the upper wall portion 31 from right, left, and rear side portions of the upper wall portion 31, respectively. An attachment extension 37 extends outward from a fore side portion of the upper wall portion 31 after being slightly stepped downward. Attachment holes 34a, 35a, 36a, and 37a are formed in the attachment extensions 34, 35, 36, and 37 to enable the impact energy absorbing member 30 to be fixed with screws 29 to the pad 26 included in the steering wheel body assembly Wb.

Peripheral portions of the attachment extensions 34 to 37 on the pad 26 outer edge side of the attachment holes 34a, 35a, 36a, and 37a are cut to form cutouts 34b, 35b, 36b, and 37b having a width approximately equal to the diameter of screws 29.

A horn switch mechanism H2 (FIG. 7) is fixed on the impact energy absorbing member 30 on the pad 26 side. The horn switch mechanism H2 includes a fixed contact plate 47 electrically connected to the negative terminal of a horn energization circuit, a movable contact plate 48 formed of a plate spring which is disposed on the plate 47 while being insulated from the same and which is electrically connected to the positive terminal of the horn energization circuit, and a depressing plate 49 upwardly urged by the movable contact plate 48 and maintained at a suitable distance from the fixed contact plate 47. In this embodiment, the upper wall portion 31 itself constitutes the fixed contact plate 47.

Figure 9:
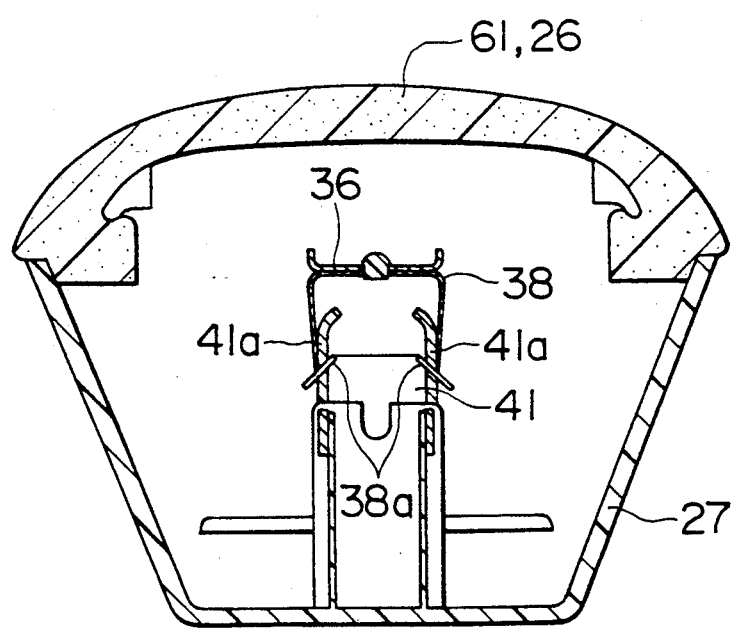
FIG. 9 a cross-sectional view of the steering wheel in accordance with the second embodiment taken along the line IX—IX of FIG. 12.

As shown in FIGS. 7, 9, and 10, an engagement member 38 is fixed to a lower surface of the attachment extension 36 of the impact energy absorbing member 30. The engagement member 38 is formed of a plate spring having a U-shaped cross-section and having check portions 38a. The engagement member 38 is engaged with a holder 41 (FIGS. 7 and 12) fixed to the spoke core 23 with a screw 40 to prevent the pad 26 from coming off. Engagement holes 41a are formed in the holder 41 to stop the movement of the check portions 38 of the engagement member 38 in the disengaging direction alone.

The steering wheel in accordance with the second embodiment is assembled as described below. First, the impact energy absorbing member 30 is positioned so that its attachment holes 34a to 37a face the corresponding cylindrical attachment portions 65 of the insert 62 of the pad 26, and the attachment extensions 34 to 37 are attached to the insert 62 by using screws 29. The covering layer 61 of the pad 26 is thereafter formed over the insert 62.

The engaging legs 64 are then inserted into and engaged with the corresponding engagement holes 25b and the check portions 38a of the engagement member 38 are engaged with the engagement holes 41a of the holder 41. The pad 26, to which the impact energy absorbing member 30 has been attached, is thereby disposed in the predetermined position on the boss assembly B.

In the steering wheel W2 thus constructed, when impact force F is applied from the outside to a central portion of an upper surface of the pad 26, a portion of the pad 26 including the pressing portion 61a is yielded and the upper wall portion 31 of the impact energy absorbing member 30 starts moving downward together with the horn switch mechanism H2.

At this time, since the attachment extensions 34 to 36 of the impact energy absorbing member 30 fixed to the pad 26 on the steering wheel body assembly Wb with screws 29 have cutouts 34b to 36b opened through a distance approximately equal to the outside diameter of a shaft portion 29a of each screw 29 on the pad 26 outer edge side of the attachment holes 34a to 36a, the attachment extensions 34 to 36 come off the steering wheel body assembly Wb so that the screws 29 are moved apart from the cutouts 34b to 36b of the attachment holes 34a and 36a, as indicated by double-dot-dash lines in FIG. 6. Also, at this time, the attachment extension 37, which extends from the impact energy absorbing member 30 parallel to the major portion of the same after being slightly stepped downward, and in which the cutout 37b is formed, is suitably detached from the insert 62.

By these movements, the fore and rear leg portions 32 and 33 are brought into abutment against the boss plate 22 and the boss 21, to deform by buckling, so that the upper wall portion 31 of the impact energy absorbing member 30 is brought closer to the lower extensions 32a and 33a, as indicated by double-dot-dash lines in FIG. 7.

Consequently, in this steering wheel W2, the attachment extensions 34 to 36 projecting from upper side portions of the impact energy absorbing member 30 can absorb a predetermined amount of energy of impact force F, even though they are fixed to the steering wheel body assembly Wb with screws 29, thereby achieving the same effect as that described in the above related art statement.

Also, in the structure of the steering wheel W2, the pad 26 is disposed over the boss assembly B while being positioned with respect to the upper surfaces of the spoke covering layers 25a, so that the fit between the outer peripheral edge of the pad 26 and the spoke covering layers 25a can be improved, thereby improving the appearance of the steering wheel. In each of the first and second embodiments described above, the cutout 14b or the like having a width approximately equal to the diameter of the shaft portion 9a or 29a of the attachment screws 9 or 29 is formed in each attachment extension of the impact energy absorbing member 10 or 30 so as to open on the peripheral side the corresponding attachment hole 14a, 15a, 34a, 35a, or 36a formed in the attachment extension. However, the width of the cutout 14b or the like may be changed as desired so long as the attachment extension 14 or the like can be detached from the steering wheel assembly Wa or Wb when impact force F is applied.

In the first and second embodiments, the impact energy absorbing members are formed of metallic plates. However, the present invention can, of course, be applied to a steering wheel using an impact energy absorbing member formed of a brittle plastic, so long as the impact energy absorbing member is capable of being reduced in size generally in the axial direction of the steering shaft to absorb the energy of impact force F.

What is claimed is:

1. A steering wheel comprising:
    a boss assembly provided at the center of said steering wheel and having a metallic core;
    an impact energy absorbing member disposed above said metallic core, said impact energy absorbing member being capable of deforming by being reduced in size generally in an axial direction of a steering shaft when it receives an impact force applied in said axial direction;

said impact energy absorb member having attachment extensions projecting outwardly from an upper peripheral portion thereof and being generally parallel to a central portion of said absorbing member;

a pad disposed over said impact energy absorbing member to cover the same; and attachment means formed in each of said attachment extensions for attaching said impact energy absorbing member to said steering wheel;

said attachment means including fasteners and attachment holes formed as cutouts and being disposed in each of said attachment extensions;

said fasteners being disposed in said cutouts to affix said attachment extensions to said steering wheel;

said attachment extensions being movable away from said fasteners by virtue of said cutouts for permitting the deformation of said impact energy absorbing member when impact force is applied to the pad.

2. A steering wheel according to claim 1, wherein said steering wheel includes spoke portions having a metallic core, said fasteners are screws and each of said attachment extensions is fixed to said metallic core of said spoke portions with said screw passed through a said attachment hole.

3. A steering wheel according to claim 1, wherein each said attachment extension is fixed to said pad with a screw passed through said attachment hole.

* * * * *